Sept. 6, 1932.　　　　G. L. USSELMAN　　　　1,876,106
POWER STAGE ARRANGEMENT
Filed March 19, 1927　　　2 Sheets-Sheet 1

INVENTOR
G.L. USSELMAN
BY
ATTORNEY

Sept. 6, 1932.  G. L. USSELMAN  1,876,106
POWER STAGE ARRANGEMENT
Filed March 19, 1927  2 Sheets-Sheet 2

INVENTOR
G. L. USSELMAN
BY
ATTORNEY

Patented Sept. 6, 1932

1,876,106

UNITED STATES PATENT OFFICE

GEORGE L. USSELMAN, OF ROCKY POINT, NEW YORK, ASSIGNOR TO RADIO CORPORATION OF AMERICA, A CORPORATION OF DELAWARE

POWER STAGE ARRANGEMENT

Application filed March 19, 1927. Serial No. 176,605.

This invention relates to an improved arrangement for a power stage in high frequency communication apparatus, and more particularly to a stage employing two electron emission tubes arranged for push-pull operation.

In designing a short wave transmitter it is exceedingly important that the length of the leads between parts of the apparatus be reduced to a minimum, and it is a primary object of my invention to reduce some of the more important output circuit leads to practically zero length.

It is a further object of my invention to provide a tuning condenser which is capable of withstanding the extremely high radio frequency potentials impressed upon it, and which at the same time is capable of being finely adjusted to accurately control the frequency to which its circuit is tuned. At high frequencies the capacitance need not be very great, and, in fact, I find it convenient to employ two condensers in series, and to adjust their capacitances by altering the distance between a movable plate and a fixed plate. More particularly, I prefer to use two fixed plates spaced a substantial distance apart and two movable plates situated between the fixed plates and arranged to be moved simultaneously nearer to or further from the fixed plates. The movable plates being electrically as well as mechanically connected it follows that the two condensers are connected in series. In this way the two outside fixed plates may be rigidly fixed and then may also serve as a mounting for the electron emission tubes, the inductor of the output circuit, and the neutralizing condensers, all of which are therefore attached to the condenser and to one another with leads which are substantially of zero length.

The specification is accompanied by drawings in which

Figure 1:
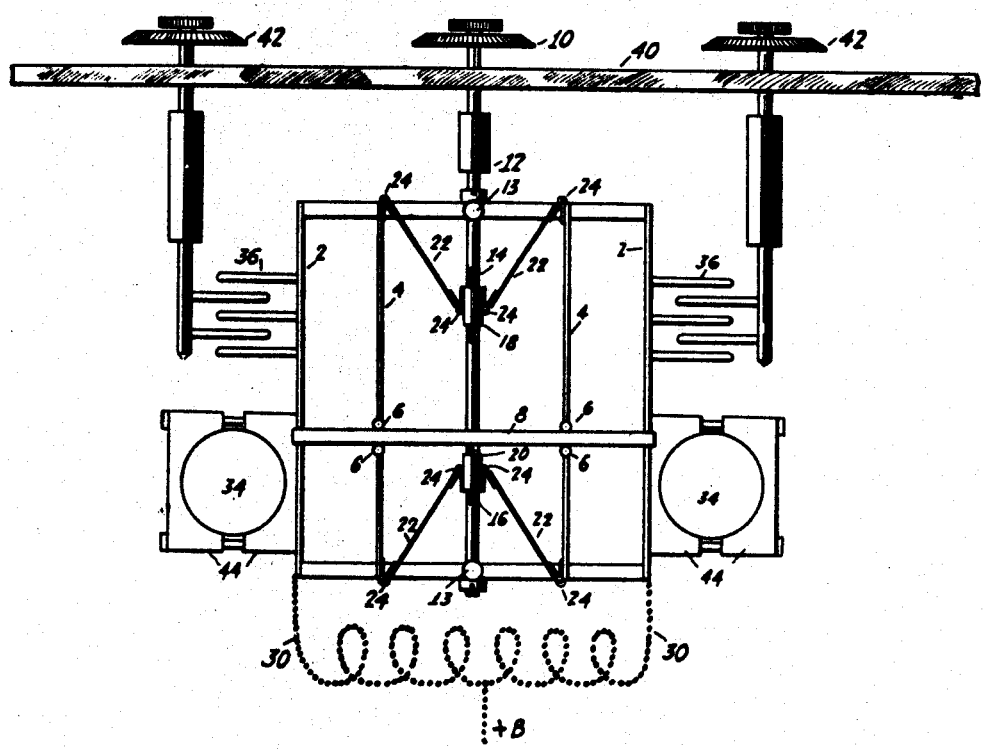
Figure 1 is a partially schematic plan view of my novel arrangement.

Referring to Figure 1; 2, 2 are the fixed plates of my novel condenser, and 4, 4 are the movable plates. The latter are guided by the rollers 6 which ride upon an insulation rail 8. The condenser is adjusted by means of the wheel or dial 10 which turns the rod 12. This rod is oppositely threaded at 14 and 16, and by means of these threads the sleeve nuts 18 and 20 are oppositely actuated. To the sleeve nuts and to the movable plates, through the medium of the hinges 24, there are fixed the link members 22. Rotation of the wheel 10 results in the movable plates 4, 4 being moved simultaneously and equally in opposite directions, thereby changing the space between plates 2 and 4 and so adjusting the capacitance of the condenser.

Figure 2:
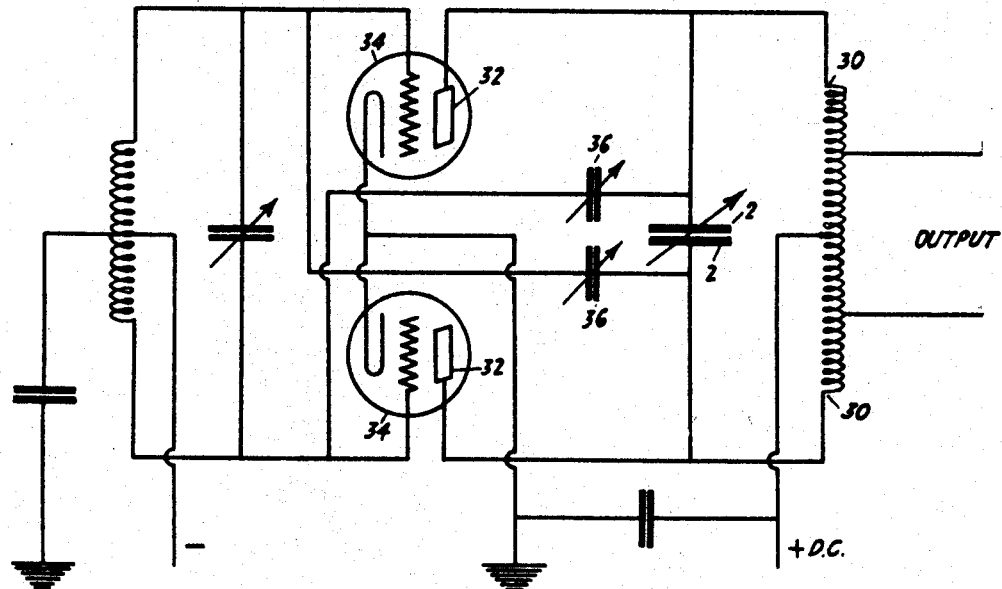
Figure 2 is a wiring diagram.

Referring now to Figure 2, which is a conventional diagram for a push-pull stage, it is seen that the terminal plates of the condenser 2, 2 are connected to the ends of the tuning inductance 30 and to the anodes 32, 32 of the tubes 34, 34, as well as to one set of plates of the neutralizing condensers 36, 36.

Referring again to Figure 1 it is seen that since the plates 2, 2 of the condenser are fixed with reference to the switch board panel 40, the neutralizing condensers 36, 36 may conveniently be mounted directly upon them. The control means for the neutralizing condensers are brought through the panel, as shown at 42, 42.

Similarly, the tubes 34, 34 may be mounted directly on the plates 2, 2, through the agency of split clamping members 44. These clamps are in contact directly with the anode jackets and terminals of the tubes 6, so making the desired electrical connection.

A coil 30, 30 has been indicated to show how the output inductor will also have leads of negligible length.

Figure 3:
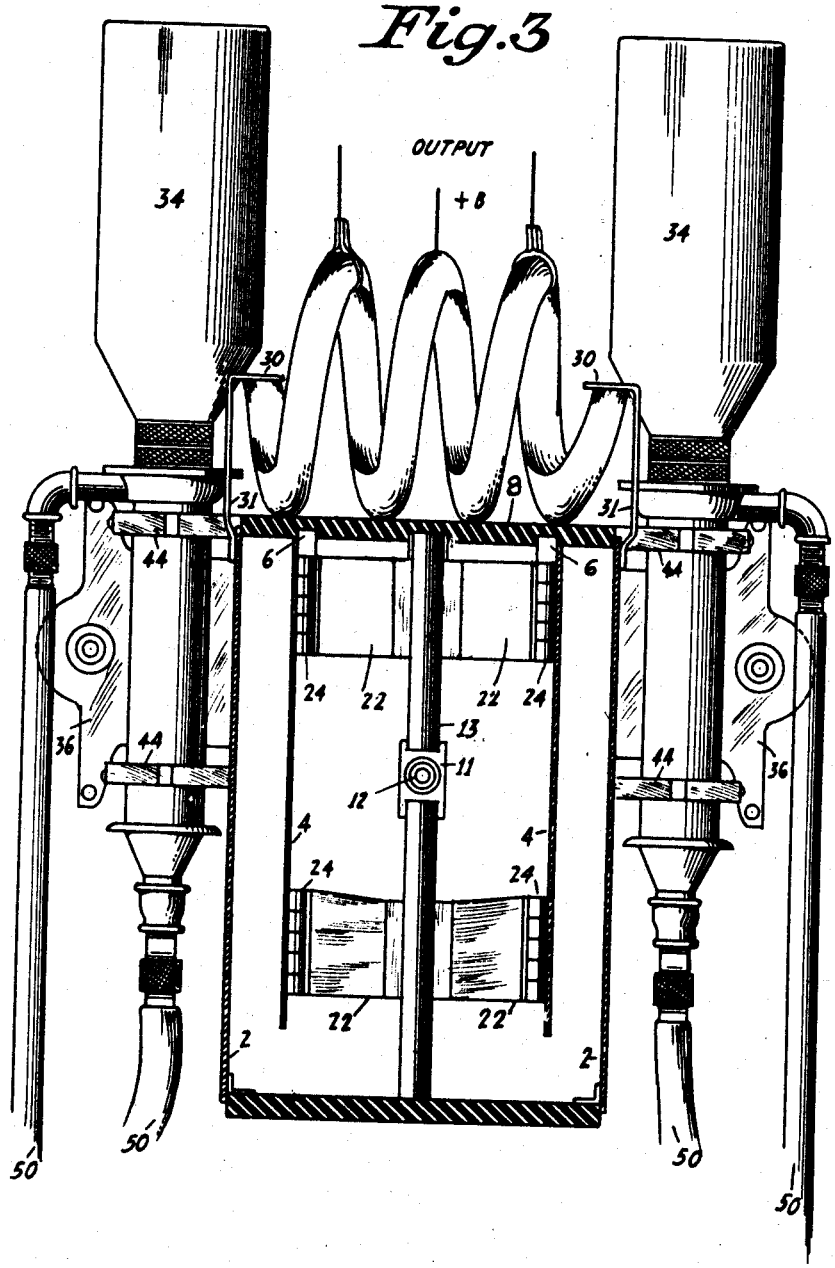
Figure 3 is a rear elevation showing the more important parts of my arrangement.

Figure 3 is an elevation, looking towards the rear of the panel. In this figure, as before, the fixed plates 2, 2 capacitively cooperate with the movable plates 4, 4. The guide rollers are shown as 6, 6, and ride upon the insulation rail 8. The link members are shown as 22, and are attached to the movable plates by the hinges 24. The end of the threaded rod 12 is mounted in a bearing 11 supported upon a vertical member 13. The tubes 34 are clamped to the fixed plates 2, 2 by the clamps 44. The tubes are constructed with their anodes at the lower end, water jacketed. These jackets, which are either of metal or of glass with metal fittings, are at anode potential, and the clamps 44 make electrical contact between them and the plates 2, 2. The anodes are connected to the metal jackets or fittings, being either integral therewith, or connected thereto through very short electrical connections. Hose inlet and outlet pipes for the cooling liquid are shown at 50.

The output inductor is positioned as shown, and its ends 30, 30 are connected to the condenser plates 2, 2 by means of the short supporting straps 31, 31.

The neutralizing condensers are shown at 36, 36, and, as before explained, these are directly affixed to the terminal plates 2, 2.

The structure herein disclosed is rigid in construction, compact in arrangement, and obtains a minimum length of interconnecting leads for the parts of the output circuit of the stage.

The foregoing is by way of illustration and not limitation of my invention, which I claim is:

1. In a push-pull power stage, a tuning condenser having fixed terminal plates, electron emission tubes having anode terminals substantially directly attached to said terminal plates, and an inductor the ends of which are substantially directly attached to said terminal plates and anode terminals.

2. In a push-pull power stage, a tuning condenser having fixed terminal plates, electron emission tubes having anode terminals substantially directly attached to said terminal plates, an inductor the ends of which are substantially directly attached to said terminal plates, and a neutralizing condenser one set of plates of which is directly attached to one of said terminal plates.

3. In a power stage, an output circuit including an inductor and a variable condenser, said condenser comprising two fixed plates and two movable plates situated between the fixed plates and arranged to be adjusted simultaneously nearer to or further from the fixed plates, said inductor being positioned adjacent to and between the planes of said fixed plates, and having its ends connected to said fixed plates.

4. In a push-pull power stage, in combination, two electron emission tubes having anode terminals, and an output circuit including inductive means and a variable condenser, said condenser comprising two fixed plates and two movable plates situated between the fixed plates and arranged to be adjusted simultaneously nearer to or further from the fixed plates, said electron emission tubes having their anode terminals substantially directly attached to said fixed condenser plates, said inductive means being positioned adjacent to said plates, and having its ends substantially directly connected to said plates and said anode terminals.

5. In a push-pull power stage, in combination, two electron emission tubes having anode terminals, and an output circuit including inductive means and a variable condenser, said condenser comprising two fixed plates and two movable plates situated between the fixed plates and arranged to be adjusted simultaneously nearer to or further from the fixed plates, said electron emission tubes having their anode terminals substantially directly attached to said fixed condenser plates, said inductive means being positioned adjacent to and between the planes of said plates, and having its ends substantially directly connected to said plates and said anode terminals.

6. In a push pull power stage, an output circuit including a tuning condenser having fixed terminal plates, an electron emission tube having its anode terminal substantially directly attached to one of said terminal plates, and another electron emission tube having its anode terminal substantially directly attached to the other of said terminal plates.

7. In a push pull power stage, an output circuit including a tuning condenser having fixed terminal plates, electron emission tubes having anode terminals substantially directly attached to said terminal plates, and neutralizing condensers the fixed plates of which are directly attached to said terminal plates.

8. In a push pull power stage, a tuning condenser having fixed terminal plates, electron emission tubes having anode terminals substantially directly attached to said terminal plates, an inductor the ends of which are substantially directly attached to said terminal plates, and neutralizing condensers the fixed plates of which are directly attached to said terminal plates.

9. In a push pull power stage, a tuning condenser comprising two fixed terminal plates and two movable plates which are situated between the fixed plates and arranged to move simultaneously nearer to or further from the fixed plates, electron emission tubes having anode terminals substantially directly attached to said terminal plates, and neutralizing condensers the fixed plates of which are directly attached to said terminal plates.

10. In a push pull power stage, a tuning condenser comprising two fixed terminal plates and two movable plates which are situated between the fixed plates and arranged to move simultaneously nearer to or further from the fixed plates, electron emission tubes having anode terminals substantially directly attached to said terminal plates, an inductor the ends of which are substantially directly attached to said terminal plates, and neutralizing condensers the fixed plates of which are directly attached to said terminal plates.

11. In a push pull power stage, in combination, two electron emission tubes having anode terminals, an output circuit including inductive means and a variable condenser, said variable condenser comprising two fixed terminal plates and two movable plates situated between the terminal plates and arranged to be adjusted simultaneously nearer to or further from the terminal plates, said electron emission tubes having their anode terminals substantially directly attached to said terminal plates, said inductive means being positioned adjacent to said plates and having its ends substantially directly connected to said terminal plates, and neutralizing condensers the fixed plates of which are directly attached to said terminal plates.

12. The combination in a high frequency transmitting system of a pair of electron discharge devices having water cooling jackets, means connecting said discharge devices in pushpull relation, said means including a tuning condenser for causing the system to operate at a predetermined frequency and variable neutralizing capacitors mounted upon said tuning condenser, each of said capacitors being connected electrically to said tuning means and the cooling jacket of one of said discharge devices.

13. A symmetrical pushpull high frequency power amplifier stage comprising a tuning condenser having two fixed condenser plates arranged in parallel vertical planes, a plurality of movable plates arranged in planes parallel to the planes of said fixed plates, said movable plates being arranged so as to be movable in a direction transverse to the planes of all of said plates, an inductor connected across said fixed plates, said inductor and movable plates being arranged symmetrically with respect to a median vertical plane parallel to the plane of said fixed condenser plates, an electron discharge device having an anode mounted upon and in substantially direct electrical connection with one of said fixed condenser plates, another electron discharge device similarly mounted and connected upon said other fixed condenser plate, and variable neutralizing condensers having their stators in electrical connection with and symmetrically mounted upon said fixed condenser plates, the entire arrangement being such that for all adjusted positions of the movable plates cooperating electrically with said fixed condenser plates, the power amplifier stage remains symmetrical with respect to said vertical median plane parallel to said fixed condenser plates.

14. In a high frequency power amplifier stage, a tuning condenser comprising a pair of fixed condenser plates arranged in parallel planes, an electron discharge device having its anode supported by and in substantially direct contact with one of said fixed plates, another electron discharge device having its anode supported by and in substantially direct contact with another of said fixed condenser plates, an inductor connected across said fixed plates, said devices, inductor and plates being arranged symmetrically with respect to a plane parallel to but intermediate the planes of said fixed condenser plates, a neutralizing condenser having a stator mounted directly upon and electrically connected to one of said fixed condenser plates, another neutralizing condenser similarly mounted and connected upon the other of said fixed condenser plates, a plurality of movable plates cooperating with said fixed condenser plates for varying the effective capacity between said fixed condenser plates, and means for symmetrically adjusting said movable plates with respect to said fixed plates to vary the tuning of said inductor and fixed condenser.

15. A power amplifier stage for amplifying high frequency electrical currents comprising a main tuning condenser, said condenser having a pair of fixed plane parallel condenser plates, an inductor connected across said fixed plates and arranged symmetrically with respect to a median plane parallel to said fixed condenser plates, electron discharge devices having their anodes substantially in direct electrical contact with and mounted symmetrically with respect to said median plane, upon said fixed condenser plates, and tuning means, for varying the capacity between the fixed plates of said condenser in order to alter the resonant frequency of said inductor and fixed condenser, said tuning means comprising a plurality of movable condenser plates, adjustably mounted with respect to said fixed plates in a fashion such that for all values of capacity for said tuning condenser, said movable plates are symmetrically disposed with respect to said median plane.

GEORGE L. USSELMAN.